3,044,973
MOLDING COMPOSITION COMPRISING MELAMINE FORMALDEHYDE RESIN AND MONOMETHYLOL MELAMINE, AND CURED PRODUCT THEREOF
Nicholas R. Segro, Glenbrook, Conn., and Yun Jen, Anaheim, Calif., assignors to American Cyanamid Company, New York, N.Y., a corporation of Maine
No Drawing. Filed Nov. 25, 1959, Ser. No. 855,278
9 Claims. (Cl. 260—17.3)

This invention relates to thermosetting melamine-formaldehyde resins. Still further, this invention relates to water-soluble, thermosetting melamine resin molding compounds which exhibit improved flow properties upon conversion to an insoluble and infusible cured state. More specifically, the present invention concerns molding compositions wherein the resinous component comprises a combination of a melamine resin and monomethylolated melamine, the latter serving as an efficacious flow promoter.

Water-soluble thermosetting condensates of melamine and formaldehyde are used extensively in the molding and laminating fields, encompassing both industrial and decorative type applications. The thermoset products derived from such condensates are known to exhibit a combination of very desirable characteristics, such as excellent decorative qualities combined with outstanding hardness, superior nonflammability and marked light- and thermal-stability properties. In spite of the overall excellent properties associated with cured melamine-formaldehye condensates, there is need at times to improve the flow characteristics of the thermosetting condensate. Our invention provides a way of achieving improved flow properties when the condensate is undergoing curing in the ultimate molding operation without any significant sacrifice of other desirable properties for which the cured products are noted.

In many applications the degree of flow associated with the conventional melamine-formaldehyde condensation products that may serve as resinous molding compounds is ample. However, there are a large number of applications employing melamine resins wherein increased flow properties over and beyond those inherently exhibited by the condensate itself are particularly desired. In molding applications directed to fabrication of large complicated shaped objects, such as radio housings, where good decorative appearance is a prime consumer requirement, the flow characteristic exhibited by the molding composition is of critical concern. Additionally, in the laminating art, melamine resins having improved flow properties can be advantageously used although, as is known to those skilled in this art, the obtaining of adequate flow properties in such an application does not present the problems which are encountered in the fabrication of filled molded objects.

Numerous materials have been taught by the prior art for use in conjunction with a thermosetting melamine-formaldehyde condensate in order to improve the flow qualities thereof. The flow additives or promoters taught by the prior art, however, by and large also serve as a plasticizer for the cured melamine resin. Plasticizing of the melamine-formaldehyde condensate oftentimes is to be avoided because of the adverse effect on the physical strength properties of the resultant moldings which this type of modification induces.

We have discovered a novel way of effecting improved flow characteristics of melamine molding resins without the use of modifiers, whose presence may disadvantageously contribute to inferior physical strength properties of the cured resinous composition. We have made the surprising discovery that if monomethylolated melamine is employed in combination with a conventional melamine-formaldehyde molding compound, the combination will possess improved flow properties over that exhibited by the molding compound itself.

The thermosetting melamine resins that may be employed in the molding compositions of this invention are of the conventional type derived by effecting condensation of formaldehyde with melamine. The ratio of formaldehyde to melamine that may be used to prepare these condensates can be varied over a wide range. Thus, one can use from about 1.5 to 6 mols formaldehyde per mol of melamine. One may use less than 1.5 mols of formaldehyde per mol of melamine, but in such a formulation the resultant cured condensate is apt to have less than the degree of three-dimensional or thermoset structure usually desired of melamine condensates when employed to prepare the molded articles to which this invention is directed. In a more practical language, the heat distortion temperature of melamine condensates having very low amounts of combined formaldehyde is prone to be undesirably low. Accordingly, for this and other reasons, the material we employ as a flow promoter, namely monomethylolated melamine, cannot ideally be used by itself to prepare molded objects. However, monomethylolated melamine increases the flow properties of the higher methylolated derivatives when used adjunctively therewith. Therefore, the compositions of this invention are contemplated as having a specific minimum amount of a melamine-formaldehyde condensate having a combined mol ratio of formaldehyde to melamine greater than about 1.5. The preferred molar ratios of formaldehyde to melamine range from about 1.5 to 3.

In preparing the melamine-formaldehyde condensate useful in the practice of this invention, the melamine and formaldehyde may be reacted at room temperature or at elevated temperatures, at atmospheric, sub-atmospheric or super-atmospheric pressures, and under neutral, alkaline or acid conditions. However, it is generally preferred that condensation and dehydration, if the latter is practiced, be effected under pH conditions in the range of pH 7.0–11 and preferably in the range of pH 8–10 at a temperature between about 25° C. and 150° C. To effect alkaline reaction conditions, any substance yielding an alkaline aqueous solution may be used; for example, alkali metals or alkali earth metals, oxides, hydroxides or salts thereof with weak acids. Representative of some of the preferred bases and alkaline reacting salts are sodium, potassium or calcium hydroxide and sodium or potassium carbonate. Further, one may advantageously use mono, di-, or triamines, aqueous ammonium, etc., to effect suitable alkaline reaction conditions. Where acidic reaction conditions are contemplated, one may use any one of a number of acid condensation catalysts, including the various inorganic and organic acids; e.g., hydrochloric acid, sulfuric acid, phosphoric acid, acetic acid, lactic acid, phthalic anhydride or acid, maleic anhydride or acid, etc., or acid salts such as sodium acid sulfate, mono sodium sulfate, mono sodium phthalate and the like.

It is preferred that the reaction between the melamine and formaldehyde be carried out in an aqueous medium. However, it is possible to employ a non-aqueous medium. Suitable non-aqueous media include water-soluble alcohols, ketones and such polar materials as dimethylformamide, dioxane, tetrahydrofuran and the like.

The preferred molding compounds of the type herein concerned are of the non-alkylated variety. However, the use of slightly alkylated condensates or combinations of a major portion of unalkylated and a minor portion of alkylated resin are contemplated as suitable condensates for the practice of this invention. In this regard, where a reaction medium consisting of a water-soluble alcohol is employed, extensive alkylation of the condensate can be prevented by carrying out the condensation reaction on the weakly alkaline side and, of course, additionally dehydrating under said conditions.

Formaldehyde or compounds engendering formaldehyde such as paraformaldehyde, hexamethylenetetramine and the like are almost exclusively used to prepare the thermosetting melamine molding compounds to which this instant invention is directed. Of course it is contemplated that in certain instances it may be desirable to employ other aldehydes such as acetaldehyde, propionaldehyde and the like in combination with a major portion of formaldehyde or compounds engendering formaldehyde.

The effective flow promoter component in the compositions of the invention comprises monomethylolated melamine. A substantially monomethylolated melamine can be readily prepared by briefly reacting equimolecular qualities of melamine and formaldehyde in dilute aqueous solutions of about 10% concentration of total reactants and at reflux temperature. A reaction time of about 15 minutes at the reflux temperature is ordinarily ample. Once the monomethylolated derivative of melamine has formed it is advisable that the reaction system be cooled and dehydrated immediately, preferably by means of spray drying. The dehydrated material may be used in such form to prepare the compositions of this invention or alternatively the dehydrated material may be used to prepare an aqueous syrup thereof just prior to preparing a molding composition by the "wet" method of compounding the molding composition. Both of these methods will be described more in detail hereinbelow.

In order to obtain the primary objects of this invention, namely, that of preparing melamine-formaldehyde molding compositions having improved flow qualities, one may use from about 20 to 60% of monomethylolated melamine based on the total weight of the melamine resinous derivatives existing in the composition. A range of from about 25 to 50% of the monomethylol melamine on the same basis as just indicated represents the preferred amounts of this ingredient.

The monomethylolated melamine may be combined with the other melamine component in preparing the molding composition by either of two conventionally employed methods. These methods are generally referred to as either a "wet" or "dry" process. In the "wet" process, the fibrous filler is impregnated with the melamine resin in aqueous syrup form. If such a process is observed in practicing the instant invention, it is desirable to prepare an aqueous syrup of anhydrous monomethylol melamine and combine same with an aqueous syrup of the melamine condensate to be employed and then impregnate the filler in accordance with the conventional practices followed by the usual steps observed in preparing molding compositions, which steps are well known in the art.

Monomethylol melamine possesses acceptable stability properties only when stored in anhydrous condition. Accordingly, this is why we have stressed herein the desirability of spray drying or otherwise dehydrating the monomethylolated product immediately upon the formation thereof. Of course, if it is contemplated that the monomethylol product can be used relatively soon after the preparation of this component, say in the matter of about 2 hours, the aqueous reaction product need not be dehydrated but may be blended with the aqueous melamine condensate and the blended syrup employed to impregnate a filler, thus commencing wet process as described. Alternatively, the molding composition may be prepared by the "dry" method which represents the preferred method. This method consists of compounding the monomethylol melamine and the melamine-formaldehyde condensate in dry form, adding a suitable quantity of filler thereto, and blending the composition, which steps are followed by densification and granulation. It is to be appreciated that any specific details relating to the art of preparing the molding compositions set forth herein are illustrative only and do not bear on the essence of this invention.

A filler, and preferably a fibrous filler, is invaribly employed in preparing melamine resin molding compositions. The use of a filler is desired because its presence importantly contributes to the mechanical strength properties exhibited by the cured product. Additionally, the use of a filler minimizes the dimensional instability inherent in melamine resin condensates. Illustrative samples of fibrous fillers that may be employed are such as alpha cellulose, wood flour, walnut shell flour, fibrous asbestos, fiber glass, yarn cuttings, cloth cuttings, e.g., silk, rayon, wool, linen, cotton, nylon, or cloth made from polymeric or copolymeric acrylonitrile fibers, etc., ground cork and the like. The amount of filler that may be employed ranges up to about 50% by weight based on the total composition. Normally one will use as much filler as possible consistent primarily with the desired degree of molded appearance exhibited by the final molded product. In this regard a particular advantage of the instant invention resides, for the practice thereof permits the preparation of molding compositions containing a higher amount of filler than could ordinarily be used.

During the preparation of the molding compositions of this invention, dyes and pigments may be added for the preparation of colored molded products. Also, one may conventionally use the mold lubricants such as zinc stearate and the like. It is also contemplated that the molding compositions prepared in accordance with this invention may contain curing catalysts such as phthalic anhydride, benzoyl peroxide, benzoic acid and the like; as well as other additives that may be desirable to utilize.

While one of the more important applications of the present invention reside in preparing heterogeneously filled moldings, it is to be appreciated that this invention may be advantageously practiced in the preparation of the so-called high pressure melamine resin laminates.

Accordingly, the thermosetting resinous composition of this invention may be shaped or formed by molding, laminating and even extruding. The temperature that may be used in any of these operations ranges from about 130° C. to 180° C. Pressures varying from about 1000 to 10,000 p.s.i. are ordinarily employed and so contemplated herein. The molding operation may be either a compressing, injection, or transfer technique, all of which are well-known in the art.

In order that the present invention may be more completely understood the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

PREPARATION OF MONOMETHYLOL MELAMINE

Into a suitable reaction vessel equipped with a stirrer, thermometer and reflux condenser were charged 729 parts of deionized water and 161.5 parts of melamine. The slurry was adjusted to a pH of 10 employing approximately 0.3 part of 10 N sodium hydroxide. The slurry was then heated to 95° C. and maintained at this temperature for 10 minutes, following which holding period there was charged to the reaction system 109.2 parts of methanol-free Formalin (37% aqueous formaldehyde). The Formalin was charged in such a manner as to maintain a temperature as close to 95° C. as possible during the charging operation. When the charging of the Formalin had been completed the reaction mixture was stirred at 93°±2° C. for 15 minutes. Thereupon, the reaction mixture was rapidly cooled to 50° C., discharged through a filter press and dehydrated immediately by a conventional spray dry procedure.

The dehydrated monomethylol melamine prepared in the manner described is readily soluble in cold water which indicates that the product does not contain any significant amount of free melamine. Chemical, infrared and ultraviolet analyses substantiate that the product so obtained was essentially monomethylol melamine. The results of chemical analysis are as follows:

|  | Found | Calc. ($C_4H_8ON_6$) |
|---|---|---|
| C, percent | 30.64 | 30.76 |
| H, percent | 5.34 | 5.16 |
| N, percent | 53.14 | 53.83 |
| total $CH_2O$, percent | 19.1 | 19.23 |

PREPARATION OF A STANDARD TYPE MELAMINE RESIN MOLDING COMPOUND

A resinous molding compound consisting of the condensation product of formaldehyde with melamine wherein the mol ratio of formaldehyde to melamine is 2.0 was prepared in the following manner. Into a suitable reaction vessel equipped with a stirrer, thermometer and reflux condenser were charged 1743 parts of Formalin (37% aqueous formaldehyde) and 1000 parts of demineralized water. The system was adjusted to a pH of 8.5 with trimethylamine. Thereupon, 1355 parts of melamine were added and heat applied to the reaction medium. The temperature was raised to the reflux point and the reaction system held thereat until a standard condition of hydrophobicity was obtained, which is indicated when four drops of the reaction medium, when added to 25 milliliters of water at 0–3° C., results in a solution having a blue haze. The clear solution of the condensate was spray dried by conventional means.

Example I

Three molding compositions were prepared wherein the resinous molding component was (1) the spray dried melamine resin condensate described hereinabove, (2) an equal weight mixture of said condensate and monomethylolated melamine, and (3) a spray dried melamine condensate having a formaldehyde to melamine ratio of 1.5 prepared in a similar manner as described for the condensate hereinabove, respectively. All compositions were processed in the same general manner. In each instance the resinous molding compound was combined with wood flour filler on the basis of 40 parts of filler per 60 parts resin. To each combination there was added 1% zinc stearate and 1% magnesium oxide. Each composition was then blended and densified on two-roll mills with one roll at 225° F. and the other at 125° F. The densified products were granulated so as to yield compositions having comparable apparent densities. In the Table I set forth hereinbelow, the constituent make-up of the samples of this example are summarized and additionally the plasticity properties associated with each are noted.

TABLE I

|  | Sample A | Sample B | Sample C |
|---|---|---|---|
| Percent melamine resin, F/M[1]=2.0 | 60 | 30 |  |
| Percent monomethylolated melamine |  | 30 |  |
| Percent melamine resin, F/M[1]=1.5 |  |  | 60 |
| Percent red wood flour | 40 | 40 | 40 |

PLASTICITY PROPERTIES

|  |  |  |  |
|---|---|---|---|
| Tons to close in 30 sec | [2] T.S. | 8 | [2] T.S. |
| Time to close at 25 tons, sec | [2] T.S. | 9 | [2] T.S. |

[1] F/M—mol ratio of formaldehyde to melamine.
[2] T.S.—Too stiff for plasticity measurement.

The plasticity test referred to hereinabove in Table I represents a conventional test wherein one may appraise the general molding behavior of a plastic composition. In this test, a sample of the molding composition is molded in a tumbler mold and the number of tons pressure required to close the mold in 30 seconds is noted. A variation of this test consists of applying pressure of 25 tons and noting the seconds required for the mold to close.

It can be seen from the data set forth in Table I that the combination of an equal mixture of a standard molding compound and monomethylol melamine results in improved plasticity properties as compared to the use of the unmodified molding compound alone. The composition represented by sample C was included in order to point up that in compositions of this type the improvement in flowability to be realized in the practice of this invention is due to the presence of monomethylolated melamine and the fact that the use thereof may reduce the overall ratio of formaldehyde to melamine existing in the total resinous component is not of particular significance. The heat distortion temperatures observed for samples A, B and C were 156° C., 146° C. and 134° C., respectively.

Example II

The primary purpose of this example is to illustrate how improved flow properties may be obtained in the practice of the instant invention without incurring the disadvantages generally associated with the use of a typical prior art plasticizing type of flow rate promoter.

In preparing the compositions of this example the general procedure described in Example I was observed. Similarly, to each of the compositions was added 1% each of zinc stearate and magnesium oxide. The plasticizer component of composition E was added to the blend of melamine resin filler and thereupon the preparation of the final product followed along the lines used in preparing compositions D and F in accordance with the procedure described in Example I.

TABLE II

|  | Sample D | Sample E | Sample F |
|---|---|---|---|
| Percent melamine resin, F/M=2.0 | 60 | 48 | 36 |
| Percent monomethylol melamine |  |  | 24 |
| Percent wood flour filler | 40 | 40 | 40 |
| Percent plasticizer (mixture of aniline cresol and aniline shellac resins) |  | 12 |  |
| Flow mold flow, inches | .066 | .035 | .031 |
| Tons to close in 30 seconds | [1] T.S. | 25 | 23 |
| Time to close at 25 tons, sec | [1] T.S. | 32 | 30 |
| Flexural strength, p.s.i | 13,330 | 7,400 | 11,800 |
| Deflection, mils | 137 | 86 | 120 |
| Heat distortion, °C | 156 | 133 | 143 |

[1] T.S.—too stiff for plasticity measurement.

The data presented in Table II graphically illustrate the unique advantages to be secured in promoting flow properties of molding compositions in accordance with this invention. It is to be noted that the mechanical strength properties of the sample F prepared from a composition containing monomethylol melamine, as illustrated by the flexural strength property, compares favorably with the control (sample D), and is considerably superior in this regard to the composition containing the prior art flow rate promoter. Additionally, the data presented in Table II illustrate that improved flow properties may be obtained in the practice of this invention, without any substantial sacrifice in other important properties.

It is to be noted that plasticity measurements of the samples given in Table II refer to flow mold flow values. This particular type of plasticity test is oftentimes determined in conjunction with the tests described in Example I. In determining flow mold flow values, a charge of 50 grams of the ground molding composition at 20–30° C. is placed in the center of the bottom platen of a compression molding press, both platens of which are maintained at a temperature of 290±2° F. and so shaped and grooved as to produce a flat molded disk with concentric ridges ½″ apart. The bottom force is raised within 20 seconds to a point where the press gage shows initial pressure on the material and within the next 15 seconds progressively increased pressure up to a value of 18 tons is applied and this is maintained during the cure time. At the end of the time required for cure, the piece is removed and cooled. The average measurement of the thickness of the piece taken in the ring, about 2¼" from the center of the mold disk is recorded in mils or inches as the measure of plasticity. According to this test, a value in the order of 35 to 40 mils is considered as indicative of a desired degree of plasticity for the molding composition. Values in the order of 50 mils or more indicate that the molding composition does not have an adequate degree of flow properties.

*Example III*

This example is essentialy a variation of the embodiment set forth in Example II wherein a different type of fibrous filler is employed. The compositions corresponding to the samples set forth in the following Table III were prepared in the identical manner as employed in Example II. Conventional amounts of a curing catalyst consisting of phthalic anhydride and a mold lubricant consisting of zinc stearate were employed in each composition.

TABLE III

|  | Sample G | Sample H |
| --- | --- | --- |
| Percent Melamine resin, F/M=2 | 31.50 | 31.50 |
| Percent Monomethylol melamine |  | 13.50 |
| Percent Cotton flock | 13.75 | 13.75 |
| Percent Asbestos fiber | 41.25 | 41.25 |
| Percent Plasticizer (mixture of aniline cresol and aniline shellac resins) | 13.50 |  |
| Flow mold flow, inches | .039 | .039 |
| Tons to close in 30 seconds | 16 | 12 |
| Flexural strength, p.s.i | 7,800 | 11,800 |
| Deflection, mils | 66 | 80 |
| Heat distortion, °C | 122 | 169 |

*Example IV*

This example primarily illustrates that higher levels of filler contents may be utilized in the practice of this invention and yet advantageous flow properties are realized. It additionally shows that monomethylol melamine by itself is not particularly suitable as the sole resinous molding compound.

The compositions corresponding to the samples set forth in the Table IV hereinbelow were prepared in the following manner. The wood flour filler was impregnated with a 60% aqueous solution of the melamine resin condensate. The compositions were then dried at 70° C. to a volatile content of 1.8%. To each of the compositions was then added 0.5% zinc stearate and 0.1% phthalic anhydride based on the combined weight of filler and resin component. In sample L spray dried monomethylolated melamine was also added. The compositions were subsequently blended and ground by ball mill to a molding powder.

TABLE IV

|  | Sample I | Sample J | Sample K | Sample L |
| --- | --- | --- | --- | --- |
| Percent Melamine resin, F/M=2 | 72 |  |  | 45.5 |
| Percent Melamine resin, F/M=1.5 |  | 72 |  |  |
| Percent Monomethylol melamine |  |  | 72 | 19.5 |
| Percent Chopped alpha cellulose | 28 | 28 | 28 | 35.0 |
| Flow mold flow, inches | .034 | .036 | .044 | .040 |
| Tons to close in 30 sec | 12 | 19 | 18 | 10 |
| Time to close at 25 tons, sec | 14 | 15 | 19 | 8 |
| Flexural strength, p.s.i | 14,100 | 14,700 | 14,600 | 14,600 |
| Deflection, mils |  | 111 | 118 | 115 |
| Heat distortion °C | 170 |  | 141 | 179 |

What is claimed is:

1. A thermosetting resinous composition of matter comprising from about 40 to 80 parts of a heat-curable resinous condensate prepared from resin-forming reactants consisting essentially of melamine and formaldehyde wherein the molar ratio of melamine to formaldehyde is from about 1:1.5 to 1:6, respectively, and correspondingly from about 60 to 20 parts of separately prepared monomethylolmelamine.

2. A thermosetting resinous composition of matter comprising from about 50 to 75 parts of a heat-curable resinous condensate prepared from resin-forming reactants consisting essentially of melamine and formaldehyde wherein the molar ratio of melamine to formaldehyde is from about 1:1.5 to 1:6, respectively, and correspondingly from about 50 to 25 parts of separately prepared monomethylolmelamine.

3. A thermosetting resinous composition of matter comprising from about 40 to 80 parts of a heat-curable resinous condensate prepared from resin-forming reactants consisting essentially of melamine and formaldehyde wherein the molar ratio of melamine to formaldehyde is from about 1:1.5 to 1:3, respectively, and correspondingly from about 60 to 20 parts of separately prepared monomethylolmelamine.

4. A thermosetting resinous composition of matter comprising from about 50 to 75 parts of a heat-curable resinous condensate prepared from resin-forming reactants consisting essentially of melamine and formaldehyde wherein the molar ratio of melamine to formaldehyde is from about 1:1.5 to 1:3, respectively, and correspondingly from about 50 to 25 parts of separately prepared monomethylolmelamine.

5. A thermosetting molding composition comprising a fibrous filler and as the resinous component a mixture of from about 40 to 80 parts of a heat-curable resinous condensate prepared from resin-forming reactants consisting essentially of melamine and formaldehyde wherein the molar ratio of melamine to formaldehyde is from about 1:1.5 to 1:3, respectively, and correspondingly from about 60 to 20 parts of separately prepared monomethylol melamine.

6. A thermosetting molding composition comprising a cellulosic filler and as the resinous component a mixture of from about 50–75 parts of a heat-curable resinous condensate prepared from resin-forming reactants consisting essentially of melamine and formaldehyde wherein the molar ratio of melamine to formaldehyde is from about 1:1.5 to 1:3, respectively, and correspondingly from about 50 to 25 parts of separately prepared monomethylol melamine.

7. A thermosetting molding composition comprising an alpha cellulose filler and as the resinous component a mixture of from about 50–75 parts of a heat-curable resinous condensate prepared from resin-forming reactants consisting essentially of melamine and formaldehyde wherein the molar ratio of melamine to formaldehyde ranges from about 1:1.5 to 1:3, respectively, and correspondingly from about 50 to 25 parts of separately prepared monomethylol melamine.

8. The substantially insoluble and infusible composition obtained by heat- and pressure-curing of the composition according to claim 5.

9. The substantially insoluble and infusible composition obtained by heat- and pressure-curing of the composition according to claim 6.

References Cited in the file of this patent

UNITED STATES PATENTS

| 2,321,586 | D'Alelio | June 15, 1943 |
| 2,485,187 | Cadot | Oct. 18, 1949 |
| 2,816,872 | Yourtee | Dec. 17, 1957 |